United States Patent
Michel

(10) Patent No.: US 12,413,438 B2
(45) Date of Patent: Sep. 9, 2025

(54) REVERSE REQUEST-RESPONSE MESSAGE EXCHANGE

(71) Applicant: Dell Products L.P., Round Rock, TX (US)

(72) Inventor: Ruben Michel, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/476,895

(22) Filed: Sep. 28, 2023

(65) Prior Publication Data

US 2025/0112800 A1    Apr. 3, 2025

(51) Int. Cl.
*H04L 12/18* (2006.01)
*H04L 9/40* (2022.01)
*H04L 67/1014* (2022.01)
*H04L 67/1097* (2022.01)
*H04L 67/14* (2022.01)

(52) U.S. Cl.
CPC ...... *H04L 12/1868* (2013.01); *H04L 63/0272* (2013.01); *H04L 67/1014* (2013.01); *H04L 67/1097* (2013.01); *H04L 67/14* (2013.01)

(58) Field of Classification Search
CPC .............. H04L 12/403; H04L 63/0272; H04L 67/1014; H04L 67/14; H04N 7/17318; H04N 21/2393
See application file for complete search history.

(56) References Cited

U.S. PATENT DOCUMENTS

| | | | |
|---|---|---|---|
| 6,545,586 B1* | 4/2003 | Belliveau | H05B 47/155 340/2.24 |
| 2010/0150031 A1* | 6/2010 | Allen | H04L 67/14 370/276 |
| 2011/0222442 A1* | 9/2011 | Cole | H04L 67/1014 370/276 |
| 2012/0162538 A1* | 6/2012 | Dixon | H04N 21/441 348/734 |
| 2014/0237585 A1* | 8/2014 | Khan | H04L 63/0272 726/15 |
| 2020/0162793 A1* | 5/2020 | Christensen | H04N 7/17318 |

* cited by examiner

*Primary Examiner* — Barbara B Anyan
(74) *Attorney, Agent, or Firm* — DALY, CROWLEY, MOFFORD & DURKEE, LLP

(57) ABSTRACT

An example methodology includes, by a server, establishing a request-response communication connection with one or more clients, wherein each request-response communication connection is initiated by the one or more clients, and upgrading the request-response communication connection to a bidirectional connection. The method also includes, by the server, determining a message to send to the one or more connected clients, creating an identifier (ID) for each message to be sent, wherein the ID is unique to each of the one or more connected clients, and broadcasting the message with respective IDs on the bidirectional connection to the one or more connected clients. The server can receive a response message that includes the ID included with the broadcast message from the one or more connected clients, wherein the response message from a connected client is sent on the bidirectional connection between the server and the connected client.

20 Claims, 5 Drawing Sheets

REVERSE REQUEST-RESPONSE MESSAGE EXCHANGE

BACKGROUND

Request-response (also known as "request-reply") is a message exchange pattern computers use to communicate with each other in a network. In the request-response message exchange pattern, a requestor system sends a request message to a replier system, and the replier system receives and processes the request message, ultimately sending a response message to the requestor system. For example, Hypertext Transfer Protocol Secure (HTTPS), which is an extension of the Hypertext Transfer Protocol (HTTP), is a request-response protocol in which a browser client issues a request to a server, which processes the request and sends a response back to the client. Request-response is a simple and effective message exchange pattern which allows two applications to have a conversation with one another over a communication channel.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes, by a server, establishing a request-response communication connection with one or more clients, wherein each request-response communication connection being initiated by the one or more clients, and upgrading the request-response communication connection to a bidirectional connection. The method also includes, by the server, determining a message to send to the one or more connected clients, creating an identifier (ID) for each message to be sent, wherein the ID is unique to each of the one or more connected clients, and broadcasting the message with respective IDs to the one or more connected clients on the bidirectional connection between the server and each of the one or more connected clients. The method further includes, by the server, receiving a response message from the one or more connected clients, wherein the response message from a connected client is sent on the bidirectional connection between the server and the connected client, and wherein the response message from the connected client includes the ID included with the message broadcast to the connected client.

In some embodiments, the request-response communication connection is one of a Hypertext Transfer Protocol (HTTP) connection or a HTTP Secure (HTTPS) connection.

In some embodiments, the bidirectional connection is one of a WebSocket connection or a WebSocket Secure connection.

In some embodiments, the method also includes transforming, by the server, the message to a format suitable for sending on the bidirectional connection, and wherein the broadcasting is of the message in the format suitable for sending on the bidirectional connection with the respective IDs. In some embodiments, the format suitable for sending on the bidirectional connection is one of a string, JavaScript Object Notation (JSON), Extensible Markup Language (XML), or binary.

In some embodiments, the message represents a Java object in the server and a corresponding TypeScript object in the client.

In some embodiments, the method also includes transforming, by the server, the response message from the one or more connected clients to a class supported by the server.

In some embodiments, the server manages resources of a storage system.

According to another illustrative embodiment provided to illustrate the broader concepts described herein, a server device includes one or more non-transitory machine-readable mediums configured to store instructions and one or more processors configured to execute the instructions stored on the one or more non-transitory machine-readable mediums. Execution of the instructions causes the one or more processors to carry out a process including establishing a request-response communication connection with one or more clients, wherein each request-response communication connection being initiated by the one or more clients, and upgrading the request-response communication connection to a bidirectional connection. The process also includes determining a message to send to the one or more connected clients, creating an identifier (ID) for each message to be sent, wherein the ID is unique to each of the one or more connected clients, and broadcasting the message with respective IDs to the one or more connected clients on the bidirectional connection between the server and each of the one or more connected clients. The process further includes receiving a response message from the one or more connected clients, wherein the response message from a connected client is sent on the bidirectional connection between the server and the connected client, and wherein the response message from the connected client includes the ID included with the message broadcast to the connected client.

According to another illustrative embodiment provided to illustrate the broader concepts described herein, a non-transitory machine-readable medium encodes instructions that when executed by one or more processors cause a process to be carried out, the process including, by a server, establishing a request-response communication connection with one or more clients, wherein each request-response communication connection being initiated by the one or more clients, and upgrading the request-response communication connection to a bidirectional connection. The process also includes, by the server, determining a message to send to the one or more connected clients, creating an identifier (ID) for each message to be sent, wherein the ID is unique to each of the one or more connected clients, and broadcasting the message with respective IDs to the one or more connected clients on the bidirectional connection between the server and each of the one or more connected clients. The process further includes, by the server, receiving a response message from the one or more connected clients, wherein the response message from a connected client is sent on the bidirectional connection between the server and the connected client, and wherein the response message from the connected client includes the ID included with the message broadcast to the connected client.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
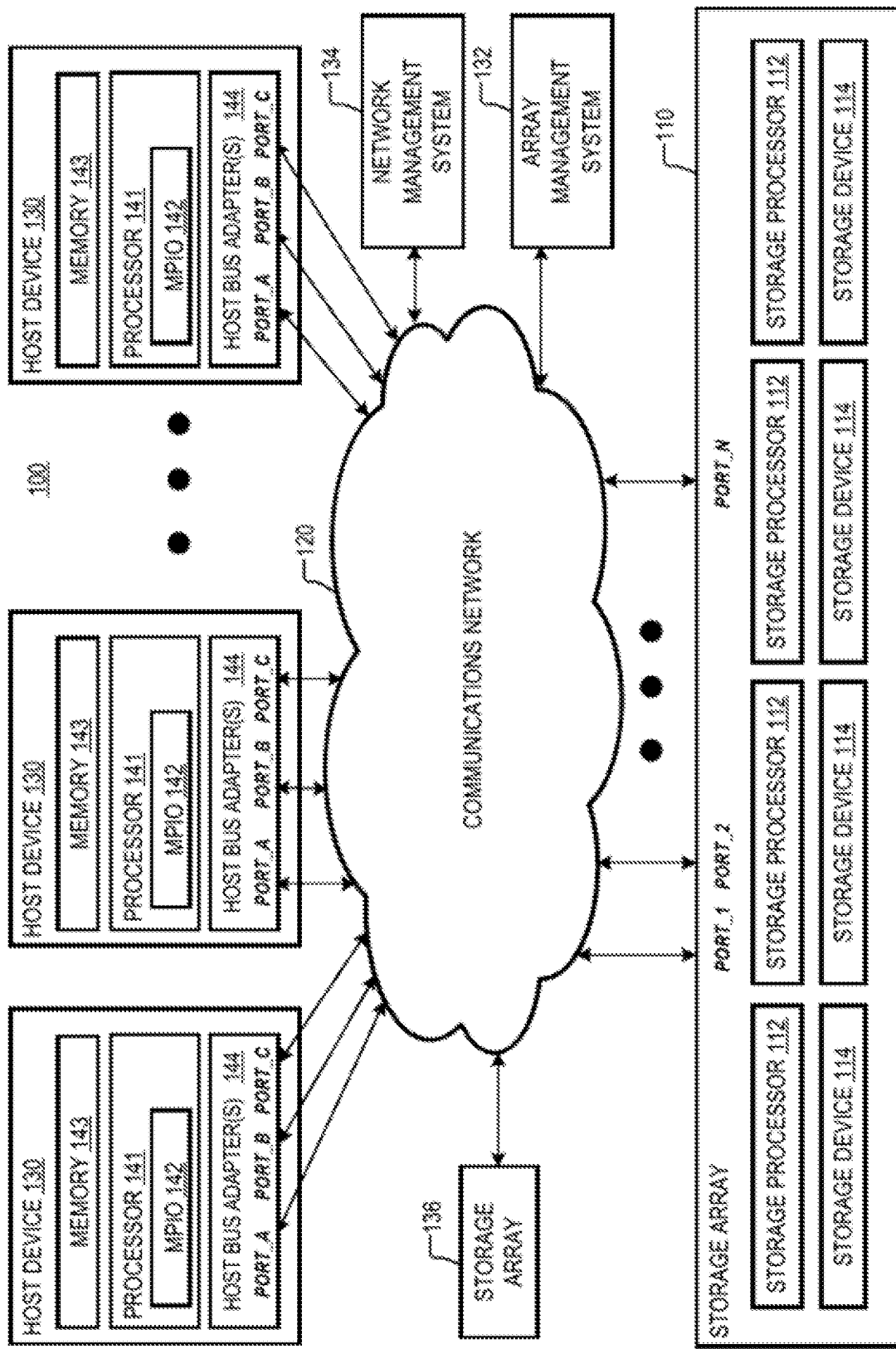
FIG. 1 is a block diagram of an illustrative storage system within which embodiments of the present disclosure may be utilized.

Request-response is a commonly used message exchange pattern where one service initiates a request to another service and waits for a response from the other service. Because the service that initiates the request performs the role of a client, and the service that receives the request performs the role of a server, this mode of communication is also referred to as client-server. However, the request-response message exchange pattern, such as the HTTPS protocol, fails to support the reverse of the request-response message exchange pattern where a server initiates a request to all connected clients, to which all the connected clients respond. Such reverse request-response message exchange pattern arises naturally in the storage management context. For example, if a drive (e.g., a logical drive) fails, an array containing the drive immediately notifies a server, which, in turn, should notify all connected clients using the drive. Examples of similar scenarios in which use of the reverse request-response message exchange pattern may arise include a storage group approaching capacity, a drive being overly active, a physical wire disconnecting, a connection to the storage system dropping, etc. With existing request-response message exchange pattern implementations, the server is unable to initiate conversations with connected clients. For example, a storage management server, such as Unisphere for PowerMax™ from Dell EMC, and other types of storage management software, cannot initiate conversations with connected clients. In particular, the storage management server, and the server in general, cannot immediately notify connected clients about incoming events. Rather, each connected client would frequently poll the server using HTTPS calls or other suitable request messaging. Such polling by all the connected clients is not only computationally expensive, but also incurs notification delays between client polls.

Disclosed herein are concepts, structures, and techniques for a reverse request-response message exchange. The concepts, structures, and techniques described herein provide a way for a server in a request-response message exchange pattern to initiate a call to all the connected clients, and the clients respond to the server. In some embodiments, a client initiates a request-response communication connection from the client to a server. There may be more than one such client initiating a request-response communication connection with the server. In this scenario, there may be a communication channel for each client. In some embodiments, the communication channel may be a secure communication channel. To enable initiation of calls to the connected clients, the server switches (or "upgrades") the communication protocol of the communication channels between the server and each of the connected clients to a bidirectional or full-duplex communication protocol. That is, the server upgrades communication connection between the server and each of the connected clients to a bidirectional or full-duplex connection. For example, in the case of HTTPS connections between the server and each of the connected clients, the server can upgrade the communication protocol to WebSocket, which is a bidirectional communication protocol that enables sending data from the client to the server or from the server to the client by reusing the established communication channels (e.g., reusing the HTTPS connections). As a result, if the server wants to initiate a communication with a connected client, the server can utilize the bidirectional communication channel to initiate a call (e.g., send a message) to the connected client. Numerous configurations and variations will be apparent in light of this disclosure.

In the description that follows, although certain embodiments and/or examples are described in the context of WebSocket as the bidirectional communication protocol, it will be appreciated in light of this disclosure that such embodiments and/or examples are not restricted as such. For example, the concepts, techniques, and structures disclosed herein are applicable to any communication protocol that allows bidirectional or full-duplex communication which allows communication to be initiated from either end of the communication channel. It will be appreciated that in such cases where a protocol other than WebSocket is utilized for bidirectional communication between a client and a server (e.g., client device and server device), the client device and the server device described below in the context of FIGS. 3 and 4 may include components other than those illustrated.

Turning now to FIG. 1, shown is a diagram of an example of a storage system 100 within which embodiments of the present disclosure may be utilized. As illustrated, system 100 may include a storage array 110, a communications network 120, a plurality of host devices 130, an array management system 132, a network management system 134, and a storage array 136.

Storage array 110 may include a plurality of storage processors 112 and a plurality of storage devices 114. Each of the storage processors 112 may include a computing device that is configured to receive I/O requests from any of the host devices 130 and execute the received I/O requests by reading or writing data to storage devices 114. In some implementations, each of the storage processors 112 may have an architecture that is the same or similar to the architecture of a computing device 500 of FIG. 5. Storage processors 112 may be located in the same geographic location or in different geographic locations. Similarly, storage devices 114 may be located in the same geographic location or in different geographic locations. Each of the storage devices 114 may include any of a solid-state drive (SSD), a non-volatile random-access memory (nvRAM) device, a non-volatile memory express (NVME) device, a hard disk (HD), and/or any other suitable type of storage device. In some implementations, storage devices 114 may be arranged in one or more Redundant Array(s) of Independent Disks (RAID) arrays.

Communications network 120 may include one or more of the Internet, a local area network (LAN), a wide area network (WAN), a fibre channel (FC) network, and/or any other suitable type of network.

Each of the host devices 130 may include a laptop, a desktop computer, a smartphone, a tablet, an Internet-of-Things device, and/or any other suitable type of electronic device that is configured to retrieve and store data in storage arrays 110 and 136. Each host device 130 may include a memory 143, a processor 141, and one or more host bus adapters (HBAs) 144. Memory 143 may include any suitable type of volatile and/or non-volatile memory, such as a solid-state drive (SSD), a hard disk (HD), a random-access memory (RAM), a Synchronous Dynamic Random-Access Memory (SDRAM), etc. Processor 141 may include any suitable type of processing circuitry, such as a general-purpose process (e.g., an x86 processor, a MIPS processor, an ARM processor, etc.), a special-purpose processor, an application-specific integrated circuit (ASIC), a field programmable gate array (FPGA), etc. Each of the HBAs 144 may be a circuit board or integrated circuit adapter that connects a respective one of the host devices 130 to storage array 110 (and/or storage array 136). In other words, each of the HBAs 144 may include a communications interface for connecting to communications network 120, storage array 110, and/or storage array 136. Although in the example of FIG. 1 each of the host devices 130 is provided with at least one HBA 144, alternative implementations are possible in which each of the host devices is provided with another type of communications interface, in addition to (or instead of) an HBA. The other type of communications interface may include one or more of an Ethernet adapter, a WiFi adapter, a local area network (LAN) adapter, etc.

Each processor 141 may be configured to execute a multi-path I/O (MPIO) driver 142. MPIO driver 142 may comprise, for example, PowerPath™ drivers from Dell EMC™, and/or other types of MPIO drivers that are arranged to discover available communications paths with any of the host devices 130 and the storage array 110. MPIO driver 142 may be configured to select I/O operations from any of the I/O queues of host devices 130. The sources of the I/O operations stored in the I/O queues may include respective processes of one or more applications executing on host devices 130.

HBA 144 of each of the host devices 130 may include one or more ports. Specifically, in the example of FIG. 1, HBA 144 of each of the host devices 130 includes three ports, which are herein enumerated as "port A", "port B", and "port C". Furthermore, storage array 110 may also include a plurality of ports. In the example of FIG. 1, the ports in storage array 110 are enumerated as "port 1", "port 2," and "port N", where N is a positive integer greater than 2. Each of the ports in host devices 130 may be coupled to one of the ports of the storage array via a corresponding network path. The corresponding network path may include one or more hops in communications network 120. Under the nomenclature of the present disclosure, a network path spanning between an HBA port of one of host devices 130 and one of the ports of the storage array 110 is referred to as a "network path of that host device 130".

Figure 5:
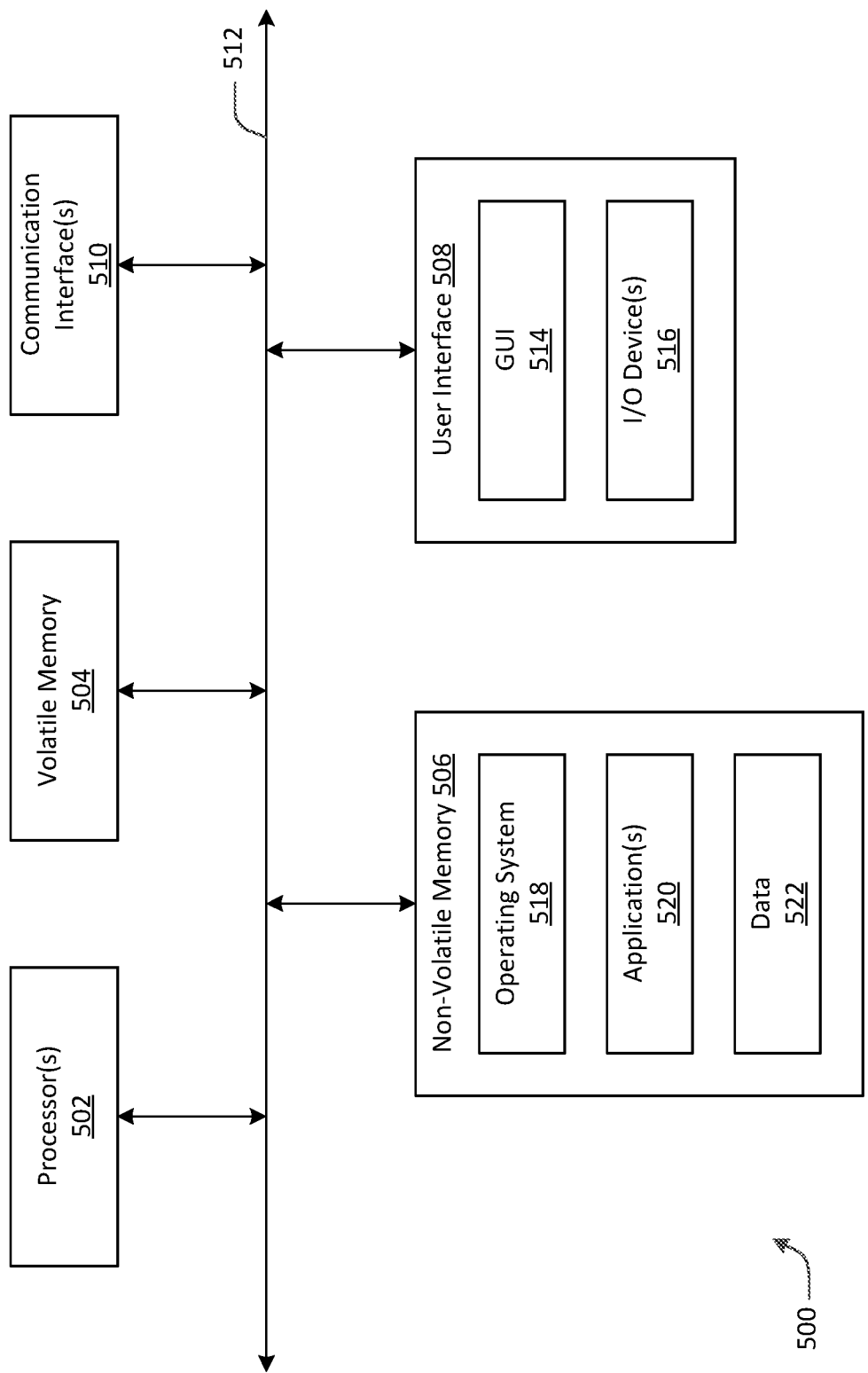
FIG. 5 is a block diagram illustrating selective components of an example computing device in which various aspects of the disclosure may be implemented, in accordance with an embodiment of the present disclosure.

Array management system 132 may include a computing device, such as computing device 500 of FIG. 5. Array management system 132 may be used by a system administrator to re-configure storage array 110, e.g., when degraded performance of storage array 110 is detected.

Network management system 134 may include a computing device, such as computing device 500 of FIG. 5. Network management system 134 may be used by a network administrator to configure communications network 120 when degraded performance of communications network 120 is detected.

Storage array 136 may be the same or similar to storage array 110. Storage array 136 may be configured to store the same data as storage array 110. Storage array 136 may be configured to operate in either active-active configuration with storage array 110 or in active-passive configuration. When storage arrays 110 and 136 operate in active-active configuration, a write request to either of storage arrays 110 and 136 is not acknowledged back to the sender until the data associated with the write request is written to both of the storage arrays 110 and 136. When storage arrays 110 and 136 are operated in active-passive configuration, a write request to a given one of the storage arrays 110 and 136 is acknowledge for as long the data associated with write request is written to the given one of the storage arrays 110 and 136 before the writing to the other one of the storage arrays is completed.

Figure 2:
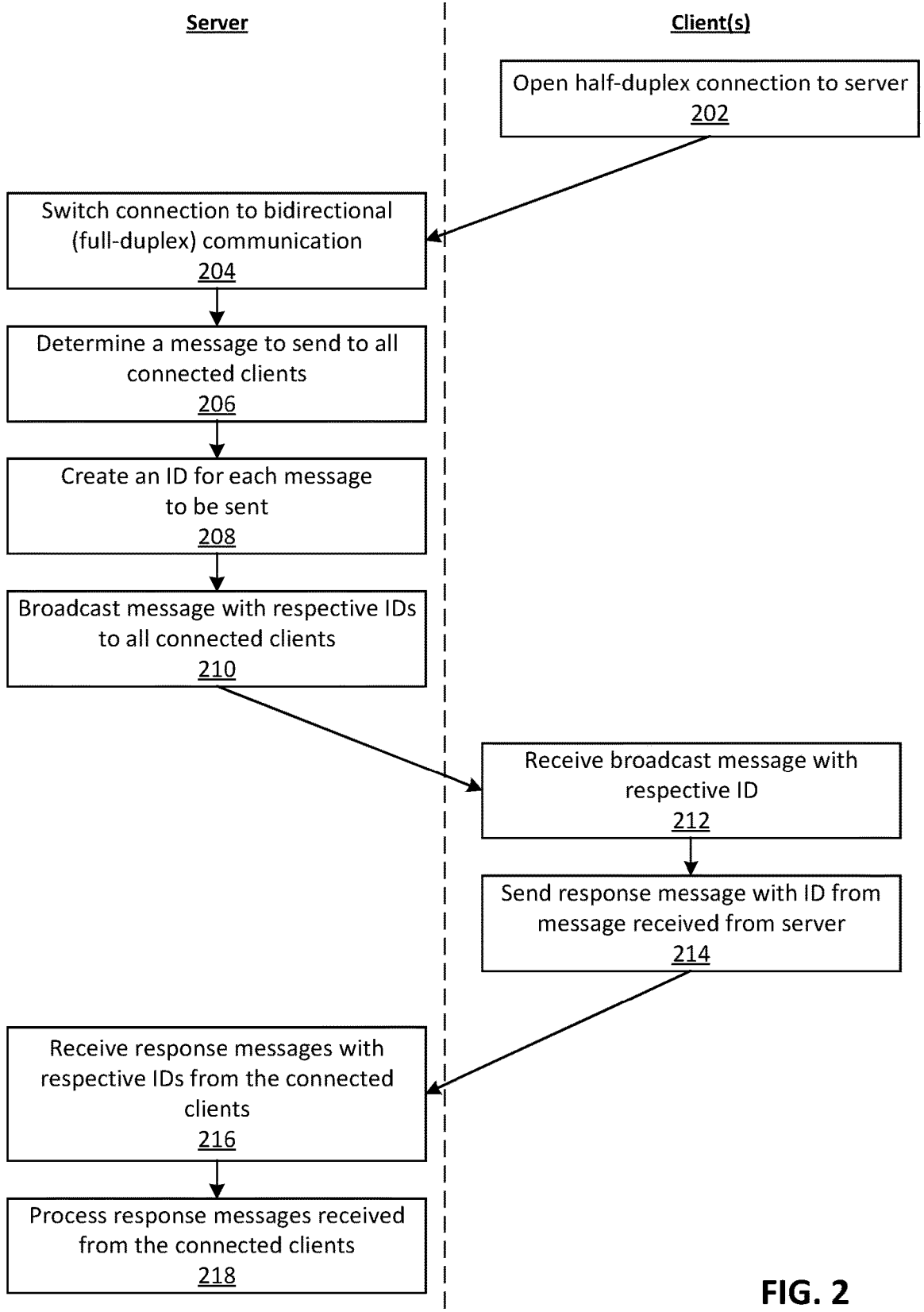
FIG. 2 shows an illustrative high-level process for implementing a reverse request-response message exchange pattern, in accordance with an embodiment of the present disclosure.

Turning now to FIG. 2, shown is an illustrative high-level process 200 for implementing a reverse request-response message exchange pattern, in accordance with an embodiment of the present disclosure. At 202, a client may open a half-duplex connection to a server. For example, the client may initiate an HTTPS connection with the server. Note that one or more clients may open a half-duplex connection to the server.

At 204, in response to the half-duplex connection being opened (or established) between the client and the server, the server may upgrade the connection to a bidirectional or full-duplex connection. For example, the server may upgrade the communication protocol of the connection opened by the client to a bidirectional communication protocol such as WebSocket. In the case there is more than one connected client (e.g., more than one client opens a half-duplex connection to the server), the server may switch each of the connections to a bidirectional or full-duplex connection (e.g., upgrade the communication protocol of each of the connections opened by the clients to Web-Socket).

At 206, the server may determine a message to send to all connected clients. By way of an example, the connected clients may be utilizing a service, e.g., a data storage service, via the server. In case of issues such as a disk failure, poor performance of a storage group, a volume about to reach capacity, etc., the server may determine that a message alerting or informing the connected clients of such condition needs to be sent.

At 208, the server may create an identifier (ID) for each message to be sent. For example, the server can assign or otherwise associate a message identifier (messageID) or other suitable identifier to each message to be sent to the connected clients. Assigning a different ID (e.g., a different messageID) to each message allows the server to uniquely distinguish the messages and the clients that are to receive the messages, as well as distinguish the subsequent messages from the clients sent in response to the message from the server. Such messages sent in response to another message are sometimes referred to herein as "response messages." For instance, the ID included with a response message from a connected client enables the server to determine which connected client sent the response message. In other words, the server can determine which connected client sent the response message by the ID included or provided with the response message.

At 210, the server may broadcast the message with respective IDs to all connected clients. The message may be sent utilizing the bidirectional communication protocol (e.g., sent on the bidirectional connection between the server and each of the connected clients). For example, suppose that the message is to be broadcast to a client A, a client B, and a client C. In this example case, when the server broadcasts the message with the respective IDs, an instance of the same message is sent on the bidirectional connections to client A, client B, and client C. For instance, the server may utilize a handler (e.g., client handler) to send the instance of the same message to client A, client B, and client C. The difference between the messages sent to client A, client B, and client C is the ID assigned to the instances of the message. For example, the instance of the message broadcast to client A may have an ID "001", the instance of the message broadcast to client B may have an ID "002", and the instance of the message broadcast to client C may have an ID "003". As mentioned previously, assigning different IDs to the instances of the message allows for distinguishing the clients receiving the message as well as determining which clients are sending the responses received the server. In another implementation, the server may utilize different handlers (e.g., different client handlers) to send the same message to the different connected clients. For instance, continuing the example above, the server may use a client handler A to send the message to client A, a client handler B to send the message to client B, and a client handler C to send the message to client C. Subsequently, if client handler B receives a response, the server is able to determine that the response received by client handler B is from client B. Similarly, if client handler A receives a response, the server is able to determine that the response received by client handler A is from client A, and if client handler C receives a response, the server is able to determine that the response received by client handler C is from client C. Note that, in this implementation, an ID need not be assigned to instances of the message.

At 212, the individual clients may receive the message broadcast by the server. The respective message received by each client may include or otherwise specify the ID assigned by the server. Each connected client may then process the received message and generate a response message in response to the message received from the server. For a particular connected client, the response message generated in response to the message received from the server includes or otherwise specifies the ID that was included or specified with the message received from the server. That is, the client maintains the ID that is assigned to the message received from the server and assigns that same ID to the response message.

At 214, the individual clients may send the response message with the ID from the message received from the server. The response message from a connected client may be sent on the bidirectional connection between the client and the server.

At 216, the server may receive the response messages with the respective IDs from the connected clients. At 218, the server may process the response messages received from the connected clients. The server can use the ID included or specified with a response message to determine which connected client sent the response message.

Figure 3:
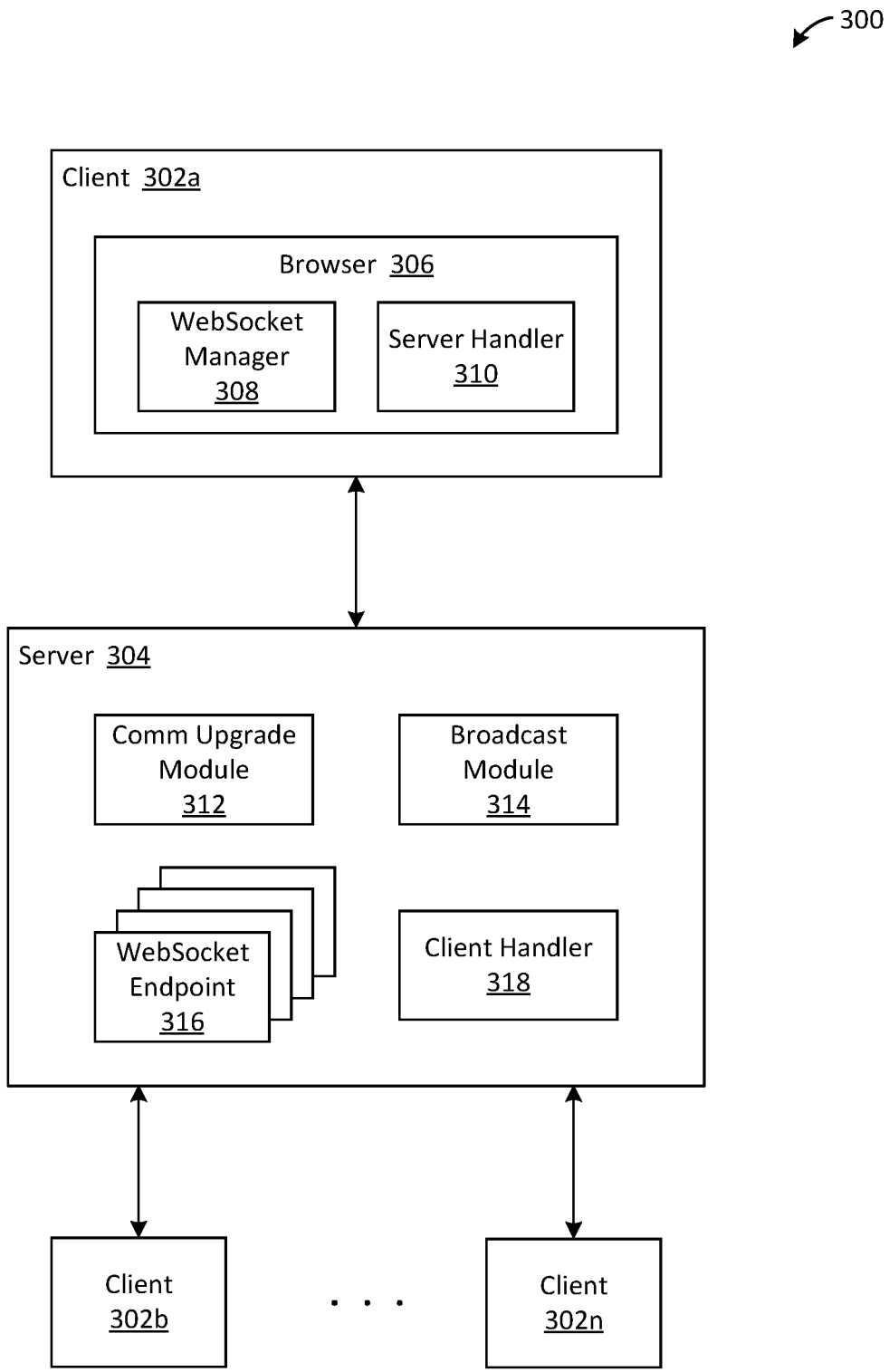
FIG. 3 is a block diagram of an illustrative client-server system for reverse request-response message exchange communication, in accordance with an embodiment of the present disclosure.

FIG. 3 is a block diagram of an illustrative client-server system 300 for reverse request-response message exchange communication, in accordance with an embodiment of the present disclosure. In particular, system 300 facilities bidirectional communication utilizing the WebSocket protocol. As shown, illustrative system 300 includes one or more clients 302a, 302b, . . . , 302n (302 generally) configured to access a server 304 via one or more communication networks (not shown). The communication networks can include, for example, the Internet, LANs, WANs, FC networks, etc.

Clients 302 can include, for example, smartphones, tablets, laptops, desktops, workstations, or other types of client devices. Clients 302 can be configured to run one or more applications, such as desktop applications, mobile applications, and other applications, including an application that provides access to services or data from a server, such as, for example, server 304. For example, as shown in FIG. 3, a representative client 302a can run a browser 306 that can access server 304. In some embodiments, browser 306 may be part of another application on client 302a. For example, browser 306 may be provided as an embedded browser on client 302a. In some embodiments, clients 302 may be the same or substantially similar to computing device 500 described below in the context of FIG. 5. The other clients 302b . . . 302n may be the same as or substantially similar to representative client 302a.

Server 304 can include a communication upgrade module 312, a broadcast module 314, one or more WebSocket endpoints 316, and a client handler 318. In embodiments, the components of server 304 (e.g., communication upgrade module 312, broadcast module 314, WebSocket endpoints 316, and client handler 318) can be implemented in software, hardware, or a combination of both software and hardware. For example, communication upgrade module 312, broadcast module 314, WebSocket endpoints 316, and client handler 318 may be implemented as computer-executable components configured to perform and execute the processes, steps, or other functionality described in conjunction therewith.

Server 304 may be hosted on one or more physical and/or virtual hardware resources, such as physical/virtual processing devices, storage devices, etc. For example, relating FIG. 3 to FIG. 1, server 304 may correspond to array management system 132 of FIG. 1. In such embodiments, server 304 can include software (e.g., Unisphere for PowerMax™ available from DELL EMC of Hopkinton, Massachusetts) for managing various resources of storage system 100 of FIG. 1.

Referring again to representative client 302a, browser 306 can include a WebSocket manager 308 and a server handler 310. WebSocket manager 308 and server handler 310 may be implemented as computer instructions executable to perform the corresponding functions disclosed herein. In some embodiments, WebSocket manager 308 and a server handler 310 can be provided as one or more extensions (e.g., browser extensions) to browser 306.

WebSocket manager 308 can provide an interface, such as an application programming interface (API), for creating and managing a WebSocket connection to a server, such as server 304. For example, in response to a request from the server to upgrade the communication protocol to WebSocket (e.g., switch from the HTTPS protocol to the WebSocket Secure protocol), WebSocket manager 308 can perform the protocol handshake with the server to change the communication protocol of the connection to WebSocket Secure.

WebSocket manager 308 can also handle the WebSocket communication. For example, WebSocket manager 308 can handle the sending and receiving of messages on a WebSocket Secure connection with a connected server. When a message is received from the connected server, WebSocket manager 308 may transform the message to a format that is supported by client 302. For example, WebSocket manager 308 may transform the message from the format used to send on the WebSocket Secure connection to TypeScript or another format that represents the message and which is supported by client 302. When sending a response message, WebSocket manager 308 may transform the response message, which may be TypeScript, for example, to a representation (or "format") that is suitable for sending on the WebSocket Secure connection. For example, WebSocket manager 308 may transform the TypeScript that represents the response message to a string, JavaScript Object Notation (JSON), Extensible Markup Language (XML), binary, or another format suitable for sending on the WebSocket Secure connection.

Server handler 310 is configured to handle the communication between client 302a and the server (e.g., server 304). Server handler 310 can provide proper delivery of response messages from client 302a to the server. For example, in response to an indication by WebSocket manager 308 of a message from the server, server handler 310 configured to handle that message can process the message (e.g., generate a response message and send the response message to WebSocket manager 308 for sending to the server).

Referring to server 304, communication upgrade module 312 is configured to upgrade a connection with a client (e.g., client 302a) to a WebSocket connection. For example, when a client, such as client 302a, makes a request for an HTTPS connection, communication upgrade module 312 can send a response to the client requesting an upgrade of the connection to a WebSocket Secure connection. The client can then send a new request to upgrade the HTTPS connection to WebSocket Secure, and communication upgrade module 312 can perform the protocol handshake with the client to change the communication protocol of the connection to WebSocket Secure.

Broadcast module 314 is configured to broadcast messages to all connected clients (e.g., clients 302). For example, to broadcast a message to a connected client, broadcast module 314 can send the message to a WebSocket endpoint (e.g., WebSocket endpoint 316) that corresponds to the connected client. That is, to send the message to a connected client, broadcast module 314 can dispatch the message to a WebSocket endpoint that is handling the WebSocket communication with the connected client. In some embodiments, broadcast module 314 may assign or otherwise associate a message identifier (messageID) or other suitable identifier to each message to be sent to the connected clients.

WebSocket endpoint 316 represents an object that can handle WebSocket communication. For example, WebSocket endpoint 316 can handle the sending and receiving of messages on a WebSocket Secure connection with a connected client. When sending a message, WebSocket endpoint 316 may transform the message, which may be a Java object, for example, to a representation (or "format") that is suitable for sending on the WebSocket Secure connection. For example, WebSocket endpoint 316 may transform a Java object that represents the message to a string, JavaScript Object Notation (JSON), Extensible Markup Language (XML), binary, or another format suitable for sending on the WebSocket Secure connection. When a response message is received from the connected client, WebSocket endpoint 316 may transform the response message back to a format that is supported by server 304. For example, WebSocket endpoint 316 may transform the message from the format used to send on the WebSocket Secure connection to Java or another format that represents the message and which is supported by server 304.

Client handler 318 is configured to handle the communication between server 304 and the connected clients (e.g., clients 302). For example, client handler 318 can handle delivery of messages to connected clients and the processing of response messages from the connected clients. In some embodiments, client handler 318 may be strongly typed meaning that the single instance of client handler 318 on server 304 can handle delivery of instances of a message of the same class to each of the connected clients. That same instance of client handler 318 can also handle response messages of the same class from the connected clients (e.g., the strongly typed instance of client handler 318 handles all instances of the response message of the same class). By way of an example, suppose that a message of a particular class (e.g., type FOO) needs to be sent to the connected clients. In this example, an instance of client handler 318 can send instances of the same message (e.g., message of the particular class type FOO) with respective IDs to each connected client. When corresponding response messages are received from the connected clients, the same instance of client handler 318 can also handle all instances of the response message of the same class (e.g. type FOO) that are sent by the connected clients and received by server 304. In other embodiments, client handler 318 may be weakly typed (or "loosely typed") meaning that an instance of client handler 318 can handle the communication between server 304 and a connected clients. By way of an example, a first instance of client handler 318 can handle delivery of a message to a first connected client and the processing of a response message from the first connected client, a second instance of client handler 318 can handle delivery of a message to a second connected client and the processing of a response message from the second connected client, and so on.

Figure 4:
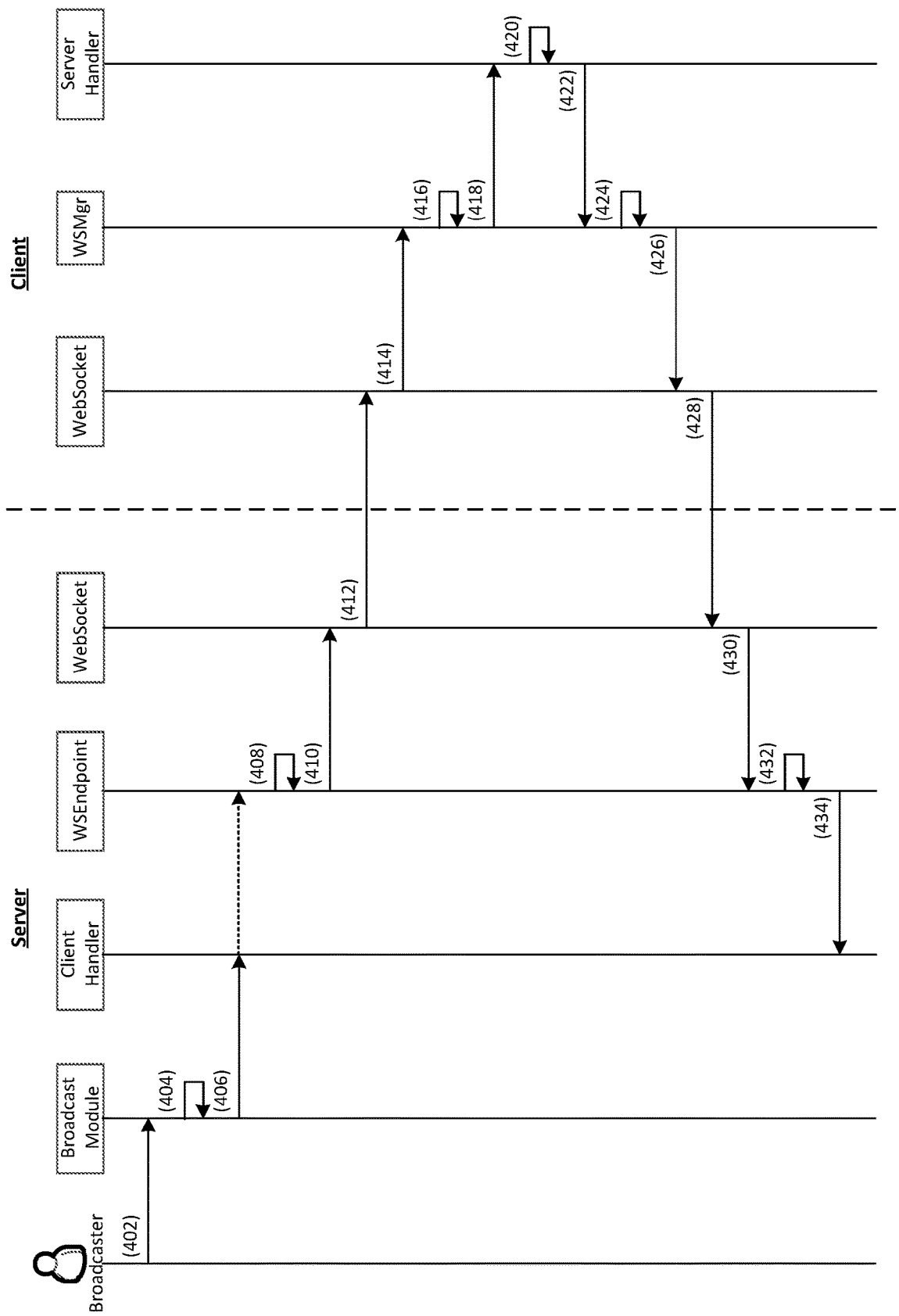
FIG. 4 is a sequence diagram showing an example flow of interactions between various components to communicate using reverse request-response message exchange, in accordance with an embodiment of the present disclosure.

Turning now to FIG. 4, shown is a sequence diagram of an example flow of interactions between various components to communicate using reverse request-response message exchange, in accordance with an embodiment of the present disclosure. FIG. 4 provides further description of the components and other processing that can be implemented within clients 302 and server 304 of FIG. 3 to perform reverse request-response message exchange. For purposes of this discussion, it is assumed that the server has upgraded the connection between the server and each one of one or more clients to a WebSocket Secure connection. It is also assumed that the server and the clients utilize an inversion of control (IoC) framework, such as that provided by Contexts and Dependency Injection (CDI), for example, to implement an eventing framework to route messages within the server and within the clients. It is further assumed that the eventing framework within the server supports synchronous and asynchronous messaging. Finally, it is assumed that the server supports Java and the clients support TypeScript. FIG. 4 illustrates the flow of interactions between components of the server and components of a representative client.

In the example of FIG. 4, a broadcaster may issue (402) a request to send a message to one or more connected clients.

In this example, the broadcaster may encompass numerous arrangements of human, hardware, software or firmware entities, as well as combinations of such entities. For example, the message may be instantiated as a CDI bean (e.g., a Java object) to the broadcast module. In response, a broadcast module (e.g., broadcast module 314 of FIG. 3) in the server can generate (404) a unique ID for each instance of the message to be sent to the one or more clients. For example, the "genID" method or equivalent can be used to generate the unique IDs. The broadcast module can then asynchronously dispatch (406) the instances of the message to the one or more WebSocket endpoints (e.g., WebSocket endpoint 316 of FIG. 3) in the server that correspond to the one or more connected clients. As mentioned previously, a WebSocket endpoint in the server represents a connected client. For example, the "asyncDispatch( )" method or equivalent can be used to asynchronously dispatch the instances of the message to the one or more WebSocket endpoints. In an implementation, the broadcast module can utilize an instance of a client handler (e.g., strongly typed client handler 318 of FIG. 3) in the server to dispatch the instances of the message to the one or more WebSocket endpoints.

The individual WebSocket endpoints can transform (408) the message to a format that is suitable for sending over the WebSocket Secure connection. For example, the "deHydrate( )" method or equivalent can be used to dehydrate the Java object to JSON. The individual WebSocket endpoints can then enqueue (410) the transformed message (e.g., the JSON with the unique ID) on the server's open WebSocket for sending to the connected client. For example, the "send( )" method or equivalent can be used to enqueue the transformed message on the open WebSocket in the server. The WebSocket in the server can then send (412) the message (e.g., the JSON with the unique ID) to the WebSocket in the connected client.

In response to the message from the server, the WebSocket in the connected client can invoke (414) a WebSocket manager (e.g., WebSocket manager 308 of FIG. 3) in the client to process the message. For example, the "onMessage( )" method or equivalent can be used to invoke the WebSocket manager in the client. In response, the WebSocket manager can transform (416) the message to a format that is supported by the connected client. For example, the "hydrate( )" method or equivalent can be used to hydrate the JSON sent by the server and received by the connected client to TypeScript. The WebSocket manager can then fire (418) an event that includes the transformed message in the connected client. For example, the "fire( )" method or equivalent can be used to fire the event.

The fired message (e.g., the TypeScript with the unique ID received from the server) can be observed by a server handler (e.g., server handler 310 of FIG. 3) in the client. The server handler can update (420) the observed message to create a valid response (e.g., generate a response to the observed message). The server handler can then asynchronously dispatch (422) the response message to the WebSocket manager in the client. For example, the "asyncDispatch( )" method or equivalent can be used to asynchronously dispatch the response message to the WebSocket manager.

The WebSocket manager can transform (424) the response message to a format that is suitable for sending over the WebSocket Secure connection. For example, the "deHydrate( )" method or equivalent can be used to dehydrate the TypeScript to JSON. The WebSocket manager can then enqueue (426) the transformed message (e.g., the JSON with the unique ID received from the server) on the client's open WebSocket for sending to the server. For example, the "send( )" method or equivalent ca be used to enqueue the transformed response message on the open WebSocket in the client. The WebSocket in the client can then send (428) the response message to the WebSocket in the server.

In response to the response message from the connected client, the WebSocket in the server can invoke (430) the WebSocket endpoint that corresponds to the connected client. to process the response message. For example, the "onMessage( )" method or equivalent can be used to invoke the WebSocket endpoint in the server. In response, the WebSocket endpoint can transform (432) the response message to a format that is supported by the server. For example, the "hydrate( )" method or equivalent can be used to hydrate the JSON sent by the connected client and received by the server to Java (e.g., a Java object). The WebSocket endpoint can then asynchronously fire (434) an event that includes the transformed response message in the server. For example, the "fireAsync( )" method or equivalent can be used to asynchronously fire the transformed response message. The fired response message (e.g., the Java object with the unique ID generated by the server) can be observed by the instance of the strongly typed client handler that is handling the response messages from the connected clients. The client handler in the server can then process the observed response message.

FIG. 5 is a block diagram illustrating selective components of an example computing device 500 in which various aspects of the disclosure may be implemented, in accordance with an embodiment of the present disclosure. For example, illustrative computing device 500 can perform all or part of the processes described herein. As shown, computing device 500 includes one or more processors 502, a volatile memory 504 (e.g., random access memory (RAM)), a non-volatile memory 506, a user interface (UI) 508, one or more communications interfaces 510, and a communications bus 512.

Non-volatile memory 506 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 508 may include a graphical user interface (GUI) 514 (e.g., a touchscreen, a display, etc.) and one or more input/output (I/O) devices 516 (e.g., a mouse, a keyboard, a microphone, one or more speakers, one or more cameras, one or more biometric scanners, one or more environmental sensors, and one or more accelerometers, etc.).

Non-volatile memory 506 stores an operating system 518, one or more applications 520, and data 522 such that, for example, computer instructions of operating system 518 and/or applications 520 are executed by processor(s) 502 out of volatile memory 504. In one example, computer instructions of operating system 518 and/or applications 520 are executed by processor(s) 502 out of volatile memory 504 to perform all or part of the processes described herein (e.g., processes illustrated and described with reference to FIGS. 1 through 4). In some embodiments, volatile memory 504 may include one or more types of RAM and/or a cache memory that may offer a faster response time than a main memory. Data may be entered using an input device of GUI 514 or received from I/O device(s) 516. Various elements of computing device 500 may communicate via communications bus 512.

The illustrated computing device 500 is shown merely as an illustrative client device or server and may be implemented by any computing or processing environment with any type of machine or set of machines that may have suitable hardware and/or software capable of operating as described herein.

Processor(s) 502 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 502 may be analog, digital, or mixed signal. In some embodiments, processor 502 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 510 may include one or more interfaces to enable computing device 500 to access a computer network such as a Local Area Network (LAN), a Wide Area Network (WAN), a Personal Area Network (PAN), or the Internet through a variety of wired and/or wireless connections, including cellular connections.

In described embodiments, computing device 500 may execute an application on behalf of a user of a client device. For example, computing device 500 may execute one or more virtual machines managed by a hypervisor. Each virtual machine may provide an execution session within which applications execute on behalf of a user or a client device, such as a hosted desktop session. Computing device 500 may also execute a terminal services session to provide a hosted desktop environment. Computing device 500 may provide access to a remote computing environment including one or more applications, one or more desktop applications, and one or more desktop sessions in which one or more applications may execute.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:
   establishing, by a server, a half-duplex request-response communication connection with one or more clients, wherein each half-duplex request-response communication connection is initiated by the one or more clients;
   in response to receiving the half-duplex request response communication connection, upgrading, by the server, the half-duplex request-response communication connection to a bidirectional connection;
   determining, by the server, a message to send to the one or more connected clients;
   creating, by the server, an identifier (ID) for each message to be sent, wherein the ID is unique to each of the one or more connected clients;
   broadcasting, by the server, the message with respective IDs to the one or more connected clients on the bidirectional connection between the server and each of the one or more connected clients; and
   receiving, by the server, a response message from the one or more connected clients, wherein the response message from a connected client is sent on the bidirectional connection between the server and the connected client, and wherein the response message from the connected client includes the ID included with the message broadcast to the connected client.

2. The method of claim 1, wherein the half-duplex request-response communication connection is one of a Hypertext Transfer Protocol (HTTP) connection or a HTTP Secure (HTTPS) connection.

3. The method of claim 1, wherein the bidirectional connection is one of a WebSocket connection or a WebSocket Secure connection.

4. The method of claim 1, further comprising transforming, by the server, the message to a format suitable for sending on the bidirectional connection, and wherein the broadcasting is of the message in the format suitable for sending on the bidirectional connection with the respective IDs.

5. The method of claim 4, wherein the format suitable for sending on the bidirectional connection is one of a string, JavaScript Object Notation (JSON), Extensible Markup Language (XML), or binary.

6. The method of claim 1, wherein the message represents a Java object in the server and a corresponding TypeScript object in the client.

7. The method of claim 1, further comprising transforming, by the server, the response message from the one or more connected clients to a class supported by the server.

8. The method of claim 1, wherein the server manages resources of a storage system.

9. A server device comprising:
   one or more non-transitory machine-readable mediums configured to store instructions; and
   one or more processors configured to execute the instructions stored on the one or more non-transitory machine-readable mediums, wherein execution of the instructions causes the one or more processors to carry out a process comprising:
      establishing a half-duplex request-response communication connection with one or more clients, wherein each half-duplex request-response communication connection is initiated by the one or more clients;
      in response to detecting the half-duplex request-response communication connection, upgrading the half-duplex request-response communication connection to a bidirectional connection;
      determining a message to send to the one or more connected clients;
      creating an identifier (ID) for each message to be sent, wherein the ID is unique to each of the one or more connected clients;
      broadcasting the message with respective IDs to the one or more connected clients on the bidirectional connection between the server and each of the one or more connected clients; and
      receiving a response message from the one or more connected clients, wherein the response message from a connected client is sent on the bidirectional connection between the server and the connected client, and wherein the response message from the connected client includes the ID included with the message broadcast to the connected client.

10. The server device of claim 9, wherein the half-duplex request-response communication connection is one of a Hypertext Transfer Protocol (HTTP) connection or a HTTP Secure (HTTPS) connection.

11. The server device of claim 9, wherein the bidirectional connection is one of a WebSocket connection or a WebSocket Secure connection.

12. The server device of claim 9, wherein the process further comprises transforming the message to a format suitable for sending on the bidirectional connection, and wherein the broadcasting is of the message in the format suitable for sending on the bidirectional connection with the respective IDs.

13. The server device of claim 12, wherein the format suitable for sending on the bidirectional connection is one of a string, JavaScript Object Notation (JSON), Extensible Markup Language (XML), or binary.

14. The server device of claim 9, wherein the message represents a Java object in the server and a corresponding TypeScript object in the client.

15. The server device of claim 9, wherein the process further comprises transforming the response message from the one or more connected clients to a class supported by the server.

16. The server device of claim 15, wherein the server device manages resources of a storage system.

17. A non-transitory machine-readable medium encoding instructions that when executed by one or more processors cause a process to be carried out, the process including:
- establishing, by a server, a half-duplex request-response communication connection with one or more clients, wherein each half-duplex request-response communication connection is initiated by the one or more clients;
- in response to detecting the half duplex request-response communication connection, upgrading, by the server, the half-duplex request-response communication connection to a bidirectional connection;
- determining, by the server, a message to send to the one or more connected clients;
- creating, by the server, an identifier (ID) for each message to be sent, wherein the ID is unique to each of the one or more connected clients;
- broadcasting, by the server, the message with respective IDs to the one or more connected clients on the bidirectional connection between the server and each of the one or more connected clients; and
- receiving, by the server, a response message from the one or more connected clients, wherein the response message from a connected client is sent on the bidirectional connection between the server and the connected client, and wherein the response message from the connected client includes the ID included with the message broadcast to the connected client.

18. The machine-readable medium of claim 17, wherein the half-duplex request-response communication connection is one of a Hypertext Transfer Protocol (HTTP) connection or a HTTP Secure (HTTPS) connection, and wherein the bidirectional connection is one of a WebSocket connection or a WebSocket Secure connection.

19. The machine-readable medium of claim 17, wherein the process further comprises transforming, by the server, the message to a format suitable for sending on the bidirectional connection, and wherein the broadcasting is of the message in the format suitable for sending on the bidirectional connection with the respective IDs.

20. The machine-readable medium of claim 17, wherein the process further comprises transforming, by the server, the response message from the one or more connected clients to a class supported by the server.

* * * * *